United States Patent
Draxler et al.

(10) Patent No.: US 6,726,740 B1
(45) Date of Patent: Apr. 27, 2004

(54) WEAKLY-MAGNETIC SINTERED COMPOSITE-MATERIAL AND A METHOD FOR PRODUCTION THEREOF

(75) Inventors: Waldemar Draxler, Markgroeningen (DE); Thomas Christmann, Stuttgart (DE); Horst Boeder, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,776

(22) PCT Filed: Oct. 26, 2000

(86) PCT No.: PCT/DE00/03801

§ 371 (c)(1),
(2), (4) Date: Nov. 13, 2001

(87) PCT Pub. No.: WO01/45116

PCT Pub. Date: Jun. 21, 2001

(30) Foreign Application Priority Data

Dec. 14, 1999 (DE) .......................................... 199 60 095

(51) Int. Cl.$^7$ ................................................. B22F 3/00
(52) U.S. Cl. .............................. 75/246; 75/232; 419/29; 419/31; 419/36; 419/54; 419/56
(58) Field of Search ...................... 75/232, 246; 419/29, 419/31, 36, 54, 56

(56) References Cited

U.S. PATENT DOCUMENTS

| | | | |
|---|---|---|---|
| 3,502,584 A | | 3/1970 | Denes |
| 4,320,080 A | * | 3/1982 | Esper et al. ................. 264/111 |
| 5,183,631 A | * | 2/1993 | Kugimiya et al. ............. 419/10 |
| 5,227,235 A | * | 7/1993 | Moro et al. .................. 428/357 |
| 5,348,800 A | * | 9/1994 | Moro et al. .................. 428/328 |
| 5,350,628 A | * | 9/1994 | Kugimiya et al. ........ 428/307.3 |
| 5,380,476 A | * | 1/1995 | Matsushita et al. ........... 264/63 |
| 6,136,265 A | * | 10/2000 | Gay ............................ 419/35 |

FOREIGN PATENT DOCUMENTS

| | | |
|---|---|---|
| EP | 0 406 580 | 1/1991 |
| EP | 0 541 887 | 5/1993 |
| JP | 53 091 397 | 8/1978 |
| JP | 01 013 705 | 1/1989 |
| JP | 06 009 273 | 1/1994 |

* cited by examiner

*Primary Examiner*—Ngoclan Mai
(74) *Attorney, Agent, or Firm*—Kenyon & Kenyon

(57) ABSTRACT

A sintered, magnetically soft composite is proposed, especially for use in solenoid valves, and a process for producing such a composite, in which initially a starting mixture from which the magnetically soft composite is formed after sintering is produced, having a ferromagnetic, especially powdery first starting component (11) as main constituent, and a ferritic second starting component (12) as secondary constituent, as well as possibly a pressing aid. After the starting mixture is sintered, the second starting component (12) is present in the produced composite at least largely as grain boundary phase. The proposed manufacturing process includes the process steps: provision of the starting mixture; mixing of the starting mixture; compression of the starting mixture in a cavity mold under increased pressure; removal of the binder from the compressed starting mixture; and sintering of the compressed starting mixture to form the composite.

22 Claims, 1 Drawing Sheet

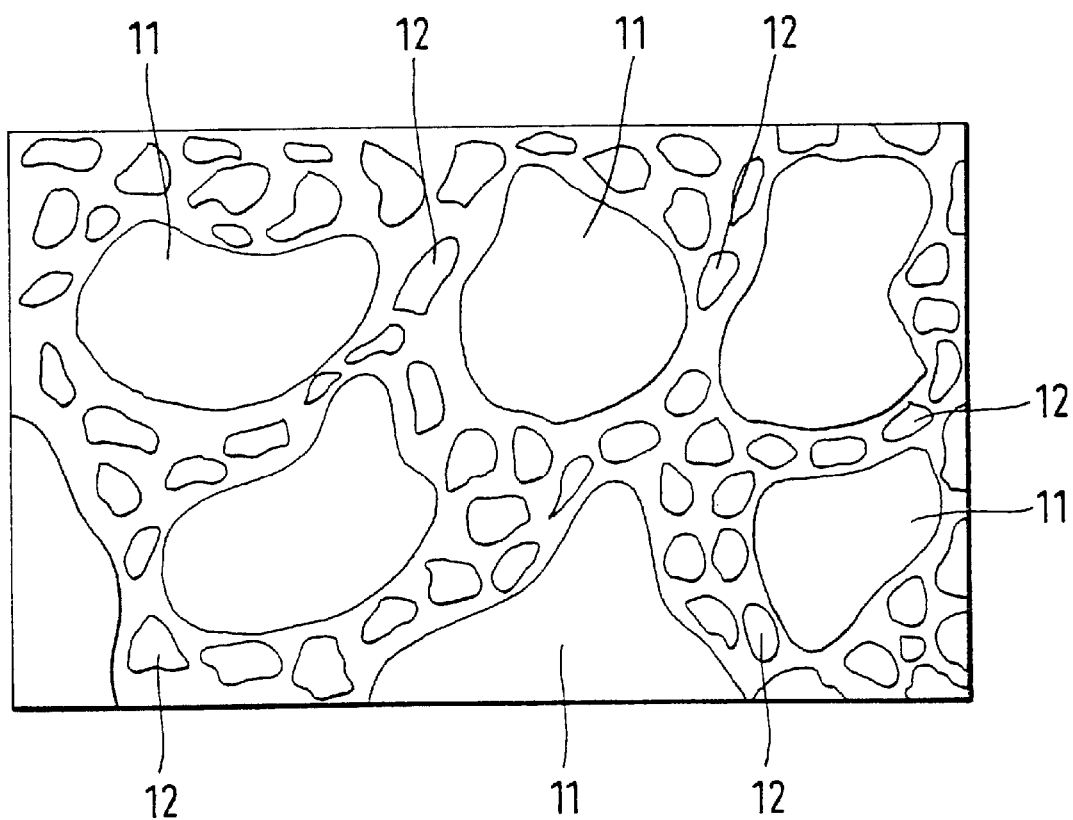

WEAKLY-MAGNETIC SINTERED COMPOSITE-MATERIAL AND A METHOD FOR PRODUCTION THEREOF

FIELD OF THE INVENTION

The present invention relates to a sintered, magnetically soft composite, especially for use in solenoid valves, and a process for manufacturing such a composite.

BACKGROUND INFORMATION

Modern gasoline and diesel engines require increasingly efficient magnetic injection valves in order, for instance, to comply with demands for reduced consumption and reduced pollutants. To that end, known fast-acting magnetic injection valves are manufactured from magnetically soft materials such as FeCr or FeCo alloys or from powdery composites having the greatest possible specific electrical resistance.

However, only a specific electrical resistance of 1 $\mu\Omega$m at most can be achieved in the metallic materials by measures using alloy technology.

Furthermore, it is also already known to use magnetic material made of iron powder and organic binder in valves for diesel injection (Common Rail System). While these materials may have higher specific electrical resistance than the aforementioned magnetically soft alloy materials, they are often fuel and temperature-stable only to a limited degree and are also difficult to work.

SUMMARY OF THE INVENTION

When compared to the related art, the sintered, magnetically soft composite according to the present invention, and the process for its manufacture, have the advantage of attaining specific electrical resistances of more than 2 $\mu\Omega$m. Furthermore, the composite according to the present invention is very temperature-resistant and, at the same time, fuel-resistant. Moreover, it is mechanically workable, at least to a limited degree.

The composite according to the present invention also achieves a saturation polarization of approx. 1.6 Tesla, which is comparable to known materials made of iron powder and organic binders.

Thus, it is advantageous that a plurality of known, commercially available powders, especially pure iron powder, phosphatized iron powder, iron-chromium alloy powders, or iron-cobalt alloy powders, can be used as ferromagnetic, powdery starting components.

In the same manner, a plurality of known soft or hard magnetic ferrite powders may likewise be used for the second, ferrimagnetic starting component. Particularly advantageous is the use of oxidic powders such as $Fe_2O_3$, of known strontium or barium hard ferrites, or known soft ferrites such as MnZn or NiZn.

To ensure that the ferrite powder preferably used as second starting component is present in the composite at least largely as grain boundary phase after sintering, i.e., that this grain boundary phase surrounds the first starting component at least in certain regions after sintering, it is further advantageous if the average particle size of the powder particles of the ferromagnetic starting component is clearly larger than the average particle size of the powder particles of the ferrite powder.

Furthermore, for increased resistance, it is advantageous that further additives such as silicon, silicon dioxide ($SiO_2$), aluminum or aluminum oxide ($Al_2O_3$), can be added to the sintered, magnetically soft composite, thereby allowing an adjustment of the physical characteristics of the manufactured composite within certain limits.

Silicon or silicon dioxide may thus be used advantageously to increase the specific electrical resistance and the permeability of the composite. For instance, aluminum or aluminum oxide is suitable for increasing the specific electrical resistance.

The pressing aid also preferably added to the starting mixture facilitates compression and molding of the starting mixture in a mold cavity. In this context, it is advantageous that this compression aid is completely removed again and vaporized when the binder is removed, so that it does not directly influence the achievable material characteristic values of the material of the sintered, magnetically soft composite obtained.

BRIEF DESCRIPTION OF THE DRAWINGS

The FIGURE shows a schematic sketch of a starting mixture.

DETAILED DESCRIPTION

To produce a sintered, magnetically soft composite by combining a powdery, ferromagnetic first starting component 11 with a ferrite powder as ferritic second starting component 12—the ferrite powder after sintering being present in the composite at least largely as grain boundary phase—pure iron powder, or iron powder prealloyed with 0.1 to 1 wt. % phosphor, (phosphatized iron powder) is initially specified as main constituent. This powder has a particle size distribution of 60 $\mu$m to 200 $\mu$m. Furthermore, a ferrite powder in the form of a powder with very fine granularity is then added to this ferromagnetic starting component 11 as second starting component 12. Suitable as ferrite powder is, for instance, a powdery soft ferrite such as an MnZn or NiZn ferrite, a powdery hard ferrite such as strontium ferrite ($6Fe_2O_3$:SrO) or barium ferrite ($6Fe_2O_3$:BaO), or iron oxide powder ($Fe_2O_3$). Preferably, the average particle size of the powder particles of second starting component 12 is less than 20 $\mu$m.

The respective weight ratios between ferromagnetic first starting component 11 and added second starting component 12 in each case are a function of the required magnetic characteristics of the composite to be produced and the desired specific electrical resistance.

As a rule, the proportion of ferromagnetic starting component 11 as main constituent is between 88 and 98 wt. %, and the proportion of second starting component 12 is between 2 and 12 wt. %.

Other additives as well may be added to the starting mixture of these two powders in order to achieve and/or precisely adjust the magnetic and electrical characteristics, respectively, of the composite to be produced. Specifically, silicon and/or aluminum as well as their oxides are particularly suitable for this purpose, both of which are added as powder having a preferred particle size of less than 50 $\mu$m.

Furthermore, microwax is expediently added to the starting mixture as a pressing aid.

It should be noted in this context that the achievable specific electrical resistance of the sintered composite ultimately obtained is mainly a function of the amount of added ferrite powder.

Basically, the composition of the starting mixture may be varied within the following parameters:

75 to 99 wt. % of pure iron powder or hosphatized iron powder as first starting component 11

1 to 25 wt. % ferrite powder as second starting component 12

0 to 2.5 wt. % aluminum powder and/or silicon powder 0 to 0.8 wt. % microwax.

Initially, the listed materials of the starting mixture are mixed together, with a mixing duration of between 30 min. and 240 min, depending on the composition.

Next, the starting mixture is formed and compressed by uniaxial pressing in a mold cavity, so that a green body results. Preferably, the pressure used in the uniaxial pressing is 500 MPa to 750 MPa.

What is claimed is:

1. A sintered, magnetically soft composite formed from a starting mixture after sintering, comprising:
 a ferromagnetic first starting component, and
 a ferritic second starting component, wherein:
  after sintering, the ferritic second starting component is present in the sintered, magnetically soft composite at least largely as a grain boundary phase; and wherein:
   the starting mixture includes at least one additional starting powder that includes one of a silicon powder, an aluminum powder, a silicon oxide powder, and an aluminum oxide powder.

2. A sintered, magnetically soft composite formed from a starting mixture after sintering, comprising:
 a ferromagnetic first starting component; and
 a ferritic second starting component, wherein:
  after sintering, the ferritic second starting component is present in the sintered, magnetically soft composite at least largely as a discrete grain boundary phase and an average size of powder particles of the ferritic second starting component is below 20 $\mu$m.

3. The sintered, magnetically soft composite according to claim 1, wherein:
 an average particle size of powder particles of the at least one additional starting powder is below 50 $\mu$m.

4. The sintered, magnetically soft composite according to claim 1, wherein:
 the starting mixture includes 75 to 99 wt. % of the ferromagnetic first starting component, 1 to 25 wt. % of the ferritic second starting component, 0 to 2.5 wt. % of the at least one additional starting powder, and 0 to 0.8 wt. % of a pressing aid.

5. A process for producing a sintered, magnetically soft composite, comprising the steps of:
 providing a starting mixture including a ferromagnetic first starting component, a ferritic second starting component, and a binder;
 mixing the starting mixture;
 compressing the starting mixture in a mold cavity under an increased pressure;
 removing a binder from the compressed starting mixture; and
 sintering the compressed starting mixture to form the sintered, magnetically soft composite, wherein:
  an average particle size of powder particles of the ferromagnetic first starting component is between 10 $\mu$m and 200 $\mu$m, and an average size of powder particles of the ferritic second starting component is below 20 $\mu$m.

6. The process according to claim 5, further comprising the step of:
 prior to performing the mixing step, adding a pressing aid to the starting mixture.

7. The process according to claim 6, wherein:
 the pressing aid includes a microwax.

8. The process according to claim 5, further comprising the step of:
 after performing the sintering step, performing a thermal after-treatment of the sintered, magnetically soft composite.

9. The process according to claim 8, wherein:
 the thermal after-treatment is performed at a temperature of 600° C. to 800° C. over a period of 20 minutes to 4 hours.

10. A process for producing a sintered, magnetically soft composite, comprising the steps of:
 providing a starting mixture including a ferromagnetic first starting component, a ferritic second starting component, and a binder;
 mixing the starting mixture;
 compressing the starting mixture in a mold cavity under an increased pressure;
 removing a binder from the compressed starting mixture;
 sintering the compressed starting mixture to form the sintered, magnetically soft composite; and
 prior to performing the compressing step, performing a heat treatment of the starting mixture over a period of 10 minutes to 60 minutes at a temperature of 400° C. to 700° C.

11. The process according to claim 10, wherein:
 the heat treatment is performed in one of an inert gas atmosphere and a gas atmosphere including oxygen.

12. The process according to claim 11, wherein:
 the inert gas atmosphere includes a nitrogen atmosphere, and
 the gas atmosphere including oxygen includes an oxygen-nitrogen mixture having 5 to 30 vol. % oxygen.

13. The process according to claim 5, wherein:
 the compressing step is performed in accordance with an uniaxial pressing at a pressure of 500 Mpa to 750 Mpa.

14. The process according to claim 8, wherein:
 the thermal after-treatment is performed in one of an inert gas atmosphere and a gas atmosphere including oxygen.

15. A process for producing a sintered, magnetically soft composite, comprising the steps of:
 providing a starting mixture including a ferromagnetic first starting component, a ferritic second starting component, and a binder;
 mixing the starting mixture;
 compressing the starting mixture in a mold cavity under an increased pressure;
 removing a binder from the compressed starting mixture;
 sintering the compressed starting mixture to form the sintered, magnetically soft composite;
 after performing the sintering step, performing a thermal after-treatment of the sintered, magnetically soft composite, wherein the thermal after-treatment is performed in a gas atmosphere including oxygen, wherein the gas atmosphere including oxygen includes an oxygen-nitrogen mixture having 5 to 30 vol. % oxygen.

16. A process for producing a sintered, magnetically soft composite, comprising the steps of:

providing a starting mixture including a ferromagnetic first starting component, a ferritic second starting component, and a binder;

mixing the starting mixture;

compressing the starting mixture in a mold cavity under an increased pressure;

removing a binder from the compressed starting mixture; and sintering the compressed starting mixture to form the sintered, magnetically soft composite, wherein:

the step of sintering includes:

a first stage performed at a temperature of 500° C. to 700° C. over a period of 30 minutes to 12 hours in one of an inert gas atmosphere and a gas atmosphere including oxygen, and a second stage performed at a temperature of 900° C. to 1150° C. over a period of 5 minutes to 120 minutes.

17. The process according to claim 16, wherein:

the inert gas atmosphere includes a nitrogen atmosphere, and the gas atmosphere including oxygen includes an oxygen-nitrogen mixture having 5 to 30 vol. % oxygen.

18. The process according to claim 16, wherein:

a temperature rise rate during the second stage of the sintering step is 15 to 40 K/min, and a cooling rate during the second stage of the sintering step is 5 to 40 K/min.

19. The process according to claim 16, wherein:

the second stage of the sintering step is performed in one of the inert gas atmosphere and the gas atmosphere including oxygen at least initially.

20. The process according to claim 19, wherein:

the inert gas atmosphere includes a nitrogen atmosphere, and an oxygen content of the gas atmosphere including oxygen one of continually decreases and incrementally decreases over a duration of the second stage of the sintering step.

21. A sintered, magnetically soft composite formed from a starting mixture after sintering, comprising:

a ferromagnetic first starting component; and a ferritic second starting component, wherein:

an average particle size of powder particles of the ferromagnetic first starting component is between 10 $\mu$m and 200 $\mu$m, and an average size of powder particles of the ferritic second starting component is below 20 $\mu$m, and after sintering, the composite includes a first discrete phase including grains of the ferromagnetic first starting compound and a second discrete phase including grains of the ferritic second starting compound.

22. The sintered, magnetically soft composite of claim 21, wherein the second discrete phase is a discrete grain boundary phase.

* * * * *

UNITED STATES PATENT AND TRADEMARK OFFICE
CERTIFICATE OF CORRECTION

PATENT NO. : 6,726,740 B1
DATED : April 27, 2004
INVENTOR(S) : Waldemar Draxler et al.

It is certified that error appears in the above-identified patent and that said Letters Patent is hereby corrected as shown below:

Column 3,
Line 3, change "hosphatized iron" to -- phosphatized iron --

Signed and Sealed this

Eighth Day of February, 2005

JON W. DUDAS
*Director of the United States Patent and Trademark Office*